United States Patent
Desai et al.

(10) Patent No.: US 12,411,630 B2
(45) Date of Patent: Sep. 9, 2025

(54) SYSTEM AND METHOD FOR MANAGING TASKS IN A STORAGE DEVICE

(71) Applicant: Samsung Electronics Co., Ltd., Suwon-si (KR)

(72) Inventors: Omkar Desai, Syracuse, NY (US); Shuyi Pei, Santa Clara, CA (US); Jing Yang, Glen Allen, VA (US); Rekha Pitchumani, Oak Hill, VA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 10 days.

(21) Appl. No.: 18/353,495

(22) Filed: Jul. 17, 2023

(65) Prior Publication Data

US 2024/0385767 A1    Nov. 21, 2024

Related U.S. Application Data

(60) Provisional application No. 63/466,923, filed on May 16, 2023.

(51) Int. Cl.
*G06F 3/06* (2006.01)
*G06F 12/02* (2006.01)

(52) U.S. Cl.
CPC ............ *G06F 3/0652* (2013.01); *G06F 3/061* (2013.01); *G06F 3/064* (2013.01); *G06F 3/0659* (2013.01); *G06F 3/0688* (2013.01); *G06F 12/0246* (2013.01); *G06F 2212/7205* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 8,468,318 B2 | 6/2013 | Colgrove et al. | |
| 9,804,787 B2 | 10/2017 | Pinto et al. | |
| 10,896,126 B2 | 1/2021 | Kim et al. | |
| 10,963,394 B2 | 3/2021 | Kachare et al. | |
| 11,010,314 B2 | 5/2021 | Therene et al. | |
| 11,030,038 B2 * | 6/2021 | Darwin | G06F 11/0757 |
| 11,544,187 B2 | 1/2023 | Sinha et al. | |
| 2018/0024932 A1 | 1/2018 | Nachimuthu et al. | |
| 2021/0072901 A1 * | 3/2021 | Kale | G06N 3/045 |
| 2021/0173588 A1 | 6/2021 | Kannan et al. | |
| 2021/0248069 A1 | 8/2021 | Jang et al. | |
| 2021/0255955 A1 * | 8/2021 | Trika | G06F 12/08 |
| 2022/0050593 A1 * | 2/2022 | Kim | G06F 12/0246 |
| 2022/0374169 A1 | 11/2022 | Zuolo et al. | |
| 2022/0413708 A1 | 12/2022 | Canepa | |

(Continued)

OTHER PUBLICATIONS

EPO Extended European Search Report dated Oct. 8, 2024, issued in corresponding European Patent Application No. 24173804.6 (14 pages).

*Primary Examiner* — Charles J Choi
(74) *Attorney, Agent, or Firm* — Lewis Roca Rothgerber Christie LLP

(57) ABSTRACT

A method for scheduling requests in a storage system includes receiving, at a scheduler, a request associated with a first storage device, receiving, at the scheduler, task information from a neural network circuit, the task information being associated with a task performed by the first storage device, and modifying a processing of the request at the first storage device based on the task information.

20 Claims, 5 Drawing Sheets

(56) References Cited

U.S. PATENT DOCUMENTS

| | | |
|---|---|---|
| 2023/0051103 A1 | 2/2023 | Roberts et al. |
| 2023/0110401 A1 | 4/2023 | Zheng et al. |
| 2023/0297519 A1* | 9/2023 | Kim .................. G06F 12/0804 706/15 |

* cited by examiner

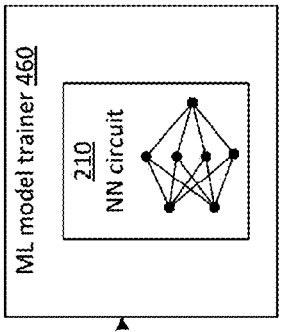
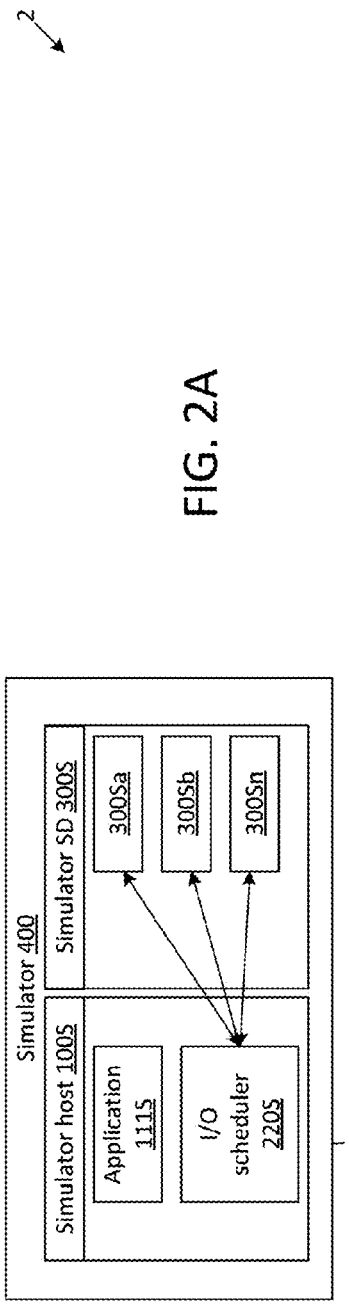
FIG. 2A
FIG. 2B

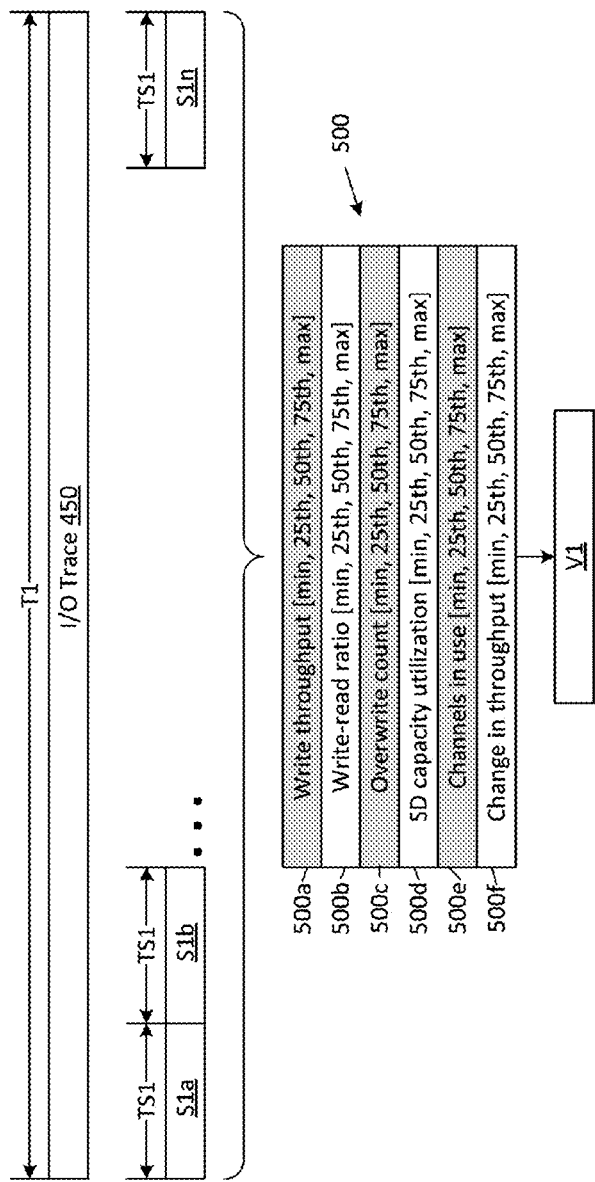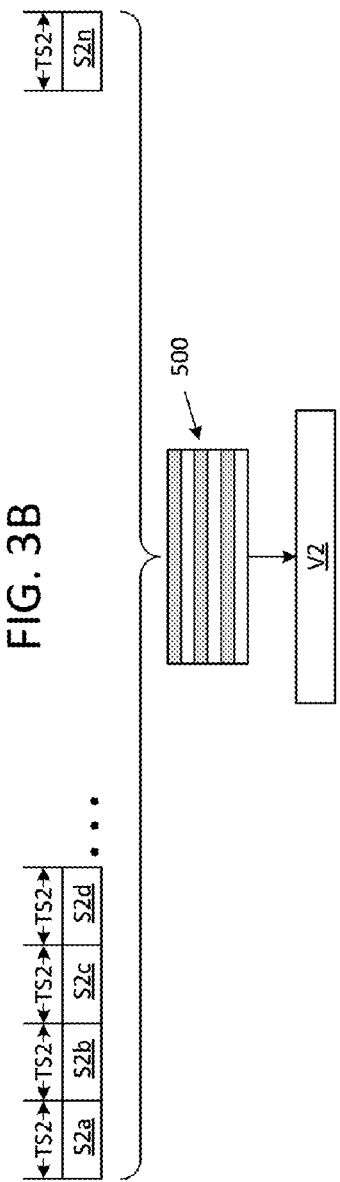

SYSTEM AND METHOD FOR MANAGING TASKS IN A STORAGE DEVICE

CROSS-REFERENCE TO RELATED APPLICATION(S)

This application claims priority to, and benefit of, U.S. Provisional Application Ser. No. 63/466,923, filed on May 16, 2023, entitled "MACHINE LEARNING (ML) BASED MODEL FOR THE PREDICTION OF INTERNAL ACTIVITY SCHEDULING IN FLASH BASED SSD," the entire content of which is incorporated herein by reference.

FIELD

Aspects of some embodiments according to the present disclosure relate to systems and methods for a machine-learning-based prediction of activity scheduling in a storage device.

BACKGROUND

In the field of computer storage, a system may include a host and one or more storage device connected to (e.g., communicably coupled to) the host. Such computer storage systems have become increasingly popular, in part, for allowing many different users to share the computing resources of the system. Storage requirements have increased over time as the number of users of such systems and the number and complexity of applications running on such systems have increased.

Accordingly, there may be a need for methods, systems, and devices that are suitable for improving the use of storage devices in storage systems.

The present background section is intended to provide context only, and the disclosure of any embodiment or concept in this section does not constitute an admission that said embodiment or concept is prior art.

SUMMARY

Aspects of some embodiments of the present disclosure relate to computer storage systems, and provide improvements to I/O processing.

According to some embodiments of the present disclosure, there is provided a method of scheduling requests in a storage system, the method including receiving, at a scheduler, a request associated with a first storage device, receiving, at the scheduler, task information from a neural network circuit, the task information being associated with a task performed by the first storage device, and modifying a processing of the request at the first storage device based on the task information.

The request may be an input/output (I/O) request, the scheduler may be an I/O scheduler, the task may be a background task, and the task information may include an indication that the first storage device has a probability of performing the background task that exceeds a threshold.

The task may include a garbage collection task or a wear levelling task.

The request may include a read request, and the modifying the processing of the request at the first storage device may include prefetching data from the first storage device based on the task information, storing the data at a buffer associated with the scheduler, and retrieving at least a portion of the data from the buffer based on the request and based on the task information.

The method may further include determining, by the scheduler, a status of the task based on information received via a firmware interface of the first storage device, and moving the data from the buffer to the first storage device based on the status.

The request may include a write request, and the modifying the processing of the request at the first storage device may include rerouting the processing of the request from the first storage device to a second storage device based on the task information.

The neural network circuit may be trained to generate the task information based on a simulation circuit configured to trace operations from applications running on a host and to generate a trace based on the operations, and a machine learning (ML) model trainer configured to input data associated with the trace to the neural network circuit.

According to some other embodiments of the present disclosure, there is provided a system for scheduling requests, the system including a processor, and a memory storing instructions, which, based on being executed by the processor, cause the processor to perform receiving a request associated with a first storage device, receiving task information from a neural network circuit, the task information being associated with a task performed by the first storage device, and modifying a processing of the request at the first storage device based on the task information.

The request may be an input/output (I/O)) request, the task may be a background task, and the task information may be generated based on a workload associated with the first storage device.

The task may include a garbage collection task or a wear levelling task.

The request may include a read request, and the modifying the processing of the request at the first storage device may include prefetching data from the first storage device based on the task information, storing the data at a buffer, and retrieving at least a portion of the data from the buffer based on the request and based on the task information.

The instructions, based on being executed by the processor, may further cause the processor to perform determining a status of the task based on information received via a firmware interface of the first storage device, and moving the data from the buffer to the first storage device based on the status.

The request may include a write request, and the modifying the processing of the request at the first storage device may include rerouting the processing of the request from the first storage device to a second storage device based on the task information.

The neural network circuit may be trained to generate the task information based on a simulation circuit configured to trace operations from applications running on a host and generate a trace based on the operations, and a machine learning (ML) model trainer configured to input data associated with the trace to the neural network circuit.

According to some other embodiments of the present disclosure, there is provided a storage system, including a neural network circuit, and a scheduler configured to be communicably coupled to the neural network circuit and a first storage device, the scheduler being further configured to receive a request associated with the first storage device, receive task information from the neural network circuit, the task information being associated with a task performed by the first storage device, and modify a processing of the request at the first storage device based on the task information.

The request may be an I/O request, the scheduler may be an I/O scheduler, the task may be a background task, and the storage system may include an all-flash array. The task may include a garbage collection task or a wear levelling task.

The request may include a read request, and the modifying the processing of the request at the first storage device may include prefetching data from the first storage device based on the task information, storing the data at a buffer associated with the scheduler, and retrieving at least a portion of the data from the buffer based on the request and based on the task information.

The scheduler may be configured to determine a status of the task based on information received via a firmware interface of the first storage device, and move the data from the buffer to the first storage device based on the status.

The request may include a write request, and the modifying the processing of the request at the first storage device may include rerouting the processing of the request from the first storage device to a second storage device based on the task information.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 2A is a system diagram depicting a system for training a neural network (NN) circuit to predict a background task in a storage device, according to some embodiments of the present disclosure.

FIG. 2B is a listing of example data associated with workload characteristic information for training the neural network circuit, according to some embodiments of the present disclosure.

FIG. 3A is a diagram depicting the processing of an I/O trace to use as an input to the neural network circuit to predict the background task, according to some embodiments of the present disclosure.

FIG. 3B is a diagram depicting the processing of an I/O trace to use as an input to the neural network circuit to predict the background task, according to some embodiments of the present disclosure.

Figure 1:
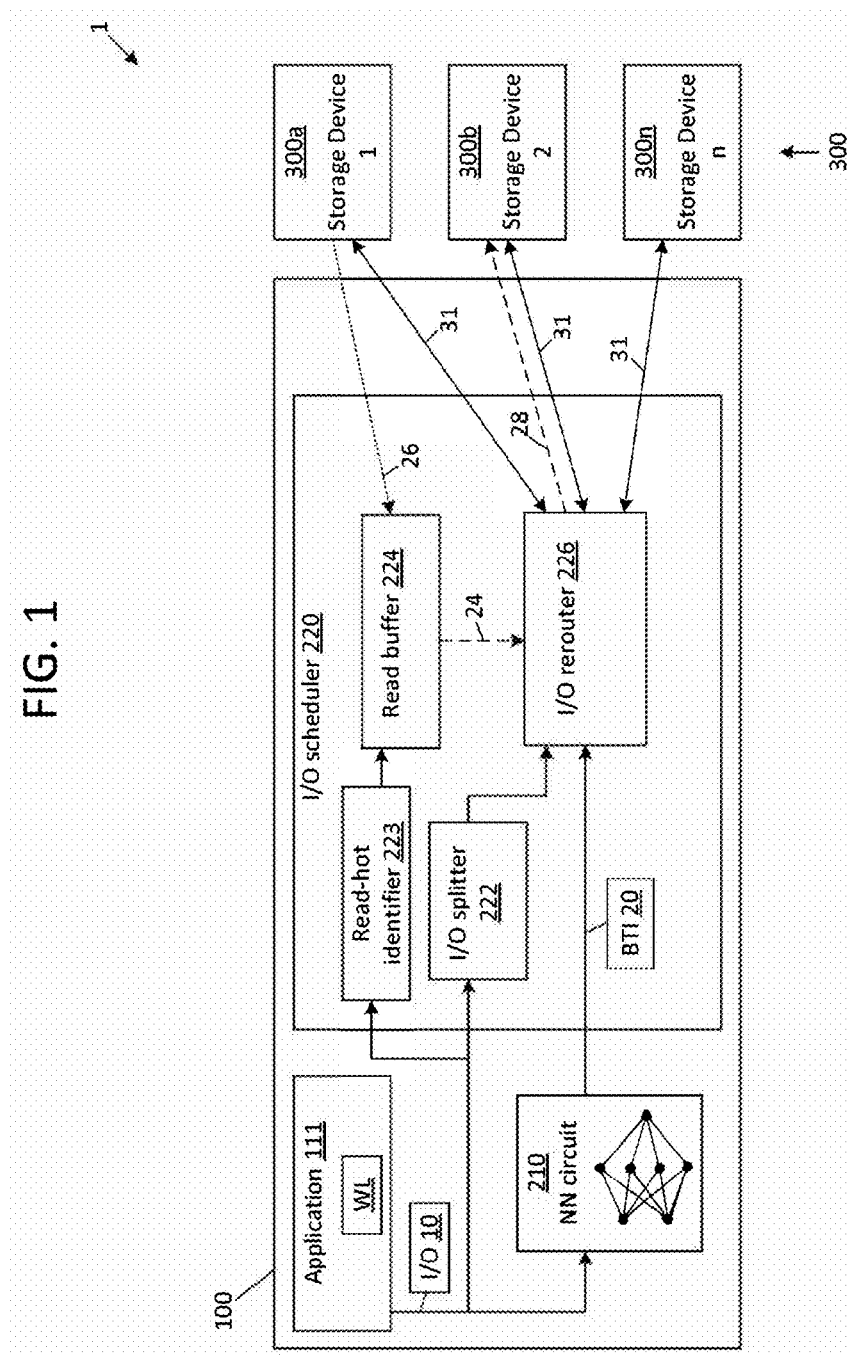
FIG. 1 is a system diagram depicting a system for scheduling input/output (I/O) requests, according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown to facilitate a less obstructed view of these various embodiments and to make the description clear.

DETAILED DESCRIPTION

Aspects of the present disclosure and methods of accomplishing the same may be understood more readily by reference to the detailed description of one or more embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey aspects of the present disclosure to those skilled in the art. Accordingly, description of processes, elements, and techniques that are not necessary to those having ordinary skill in the art for a complete understanding of the aspects and features of the present disclosure may be omitted.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or component is referred to as being "on," "connected to," or "coupled to" another element or component, it can be directly on, connected to, or coupled to the other element or component, or one or more intervening elements or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or component is referred to as being "between" two elements or components, it can be the only element or component between the two elements or components, or one or more intervening elements or components may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, each of the terms "or" and "and/or" includes any and all combinations of one or more of the associated listed items.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are merely examples, and may involve various additional operations not explicitly covered, and (ii) the temporal order of the operations may be varied.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of computer storage, a system may include a host and one or more storage devices (e.g., solid-state drives SSDs) communicably coupled to the host. The storage devices may store data associated with applications running on the host. For example, the applications may send input/output (I/O) requests to the storage devices for perform functions on the stored data. The storage devices may be configured to perform background tasks (also referred to as "housekeeping tasks") as part of the maintenance of the storage system. Scheduling of background tasks may be an internal activity of the storage device, which the host may have no control over. For example, a storage device may perform garbage collection (GC) and/or wear levelling (WL). During garbage collection, pending I/O requests may be delayed while the storage device automatically performs processes to free up memory space on the storage device. During wear levelling, pending I/O requests may be delayed while the storage device redistributes data on the storage device to even out reads and writes across storage media (e.g., NAND flash memory) of a storage system (e.g., an all-flash array (AFA)) to extend the life of the storage system.

Such background tasks may slow down the I/O performance of a storage device. For example, background tasks (such as garbage collection, wear levelling, read rescrubbing, and/or the like) may negatively impact I/O latency in a storage system. I/O performance problems may be compounded in multiple storage device systems because a single storage device may slow down multiple (e.g., all) I/O requests in the system. For example, with multi-SSD configurations, a single SSD performing an internal housekeeping activity may slow down the whole system because an I/O operation cannot be completed without fetching all of the data, and the data may be spread across many SSDs in an array. Accordingly, background tasks may increase a latency (e.g., a tail latency) for the overall system.

In some systems, information about the status of internal activity (e.g., background tasks) of a storage device is collected based on extending a protocol interface (e.g., an NVMe interface) associated with the storage device. Such an approach may make such systems protocol dependent and less flexible.

Aspects of some embodiments of the present disclosure provide a system including a machine learning (ML) model and an I/O scheduler to observe a workload on a storage device and predict when a background operation (such as garbage collection, wear levelling, read rescrubbing, and/or the like) will be triggered on the storage device. The prediction may be used to make smart re-routing and I/O buffering decisions in the system. Accordingly, the status of internal activity of the storage device may be estimated (e.g., predicted) without extending a protocol interface associated with the storage device. Thus, aspects of embodiments of the present disclosure may be implemented regardless of a specific protocol associated with the storage device.

Additionally, smart re-routing and I/O buffering decisions may be made automatically and dynamically to reduce latencies for the overall system. Aspects of some embodiments of the present disclosure may be applied to AFA systems, which commonly include garbage collection and wear levelling operations. Furthermore, by using a machine-learning model to estimate when a background task (or background activity) is likely to occur, aspects of embodiments of the present disclosure allow systems to avoid consuming storage device resources used for reporting internal storage device information to a host.

FIG. 1 is a system diagram depicting a system for scheduling input/output (I/O) requests, according to some embodiments of the present disclosure.

Referring to FIG. 1, a storage system 1 may include a host 100 that is communicably coupled to one or more storage devices 300 (individually depicted as a first storage device 300a, a second storage device 300b, and an n-th storage device 300n). It should be understood that the present disclosure may be extended to storage systems including any number of storage devices. The host may include one or more applications 111 running on the host 100. Each application 111 may perform operations associated with a workload WL. The workloads WL of one or more applications 111 may be associated with some of the storage devices 300. For example, the workload WL of an application 111 may cause the application 111 to send an I/O request 10 to access data stored at the first storage device 300a. The host 100 may include an I/O scheduler 220 to perform scheduling and routing of I/O requests 10 received from the applications 111. For example, the I/O scheduler 220 may manage a processing of write and read operations associated with the storage devices 300. As discussed in further detail below, with respect to FIGS. 2 and 3, the system 1 may characterize application I/O workloads in real time to estimate (or predict) when a storage device is likely to perform a background task (e.g., to estimate that the storage device has a probability of performing the background task that exceeds a threshold probability). In some embodiments, the I/O scheduler 220 may include an I/O splitter 222 for performing data I/O dividing operations. For example, an I/O request may be divided as part of a redundant array of independent disks (RAID) operation or a Reed-Solomon (RS) operation. For example, the I/O splitter 222 may process RAID code or RS code associated with the I/O request 10.

In some embodiments, the I/O scheduler 220 may cause data (e.g., data that is frequently accessed or data that is likely to be accessed) to be prefetched from any of the storage devices 300 that is likely to perform a background task within a certain period of time (for example within the next few minutes). For example, if the I/O scheduler 220 determines that the first storage device 300a is likely to perform a background task within a certain period of time, the I/O scheduler may trigger a data buffering operation 26 to copy data stored in the first storage device 300a from the first storage device 300a to a read buffer 224. Accordingly, if the I/O scheduler 220 receives a read request for the data while the first storage device 300a is determined to be likely to be performing the background task, the read request may be processed by way of a rerouted read operation 24. The rerouted read operation 24 may allow the data to be accessed from the read buffer 224, instead of from the first storage device 300a, without waiting for the first storage device 300a to finish the background task. In some embodiments, the data buffering operation 26 may be triggered based on a likelihood of a storage device 300 performing a background task within a certain period of time exceeding a high percentage chance (e.g., an 80% chance). In some embodiments, the I/O scheduler 220 may refer to a list (e.g., an up-to-date list) of data locations that are most frequently accessed (e.g., "read-hot blocks") for each storage device 300 that is likely to perform a background task. For example, the I/O scheduler 220 may retrieve a list of read-hot blocks, which include read-hot data, from a read-hot identifier 223 that is configured to collect data from an I/O trace (e.g., a block I/O trace) corresponding to applications 111. In some embodiments, the read-hot identifier 223 may sort logical blocks by access count. In some embodiments, the read-hot identifier 223 may consider data corresponding to data blocks that are accessed in the top 20% of all data blocks, within a storage device that is likely to perform a background task, to be read-hot data. The I/O scheduler 220 may buffer the read-hot data into the read buffer 224. While the data buffering operation 26 is in progress, read requests may be serviced from the storage device that is likely to perform the background task. A read buffer hit may allow a read request to be processed from data stored in the read buffer. In some embodiments, a read buffer miss may cause a read operation to be issued to the storage device that is likely to be performing the background task. In some embodiments, the read buffer 224 may be flushed back to the originally intended storage device 300 after the background task has been completed.

In some embodiments, the I/O scheduler 220 may include an I/O rerouter 226 (e.g., an I/O router that is capable of rerouting I/O requests). The I/O rerouter 226 may cause a write operation to be performed at a different one of the storage devices 300. For example, if the I/O scheduler 220 determines that the first storage device 300a is likely to perform a background task within a certain period of time, the I/O scheduler may trigger a rerouted write operation 28 to write data intended for the first storage device 300a to the second storage device 300b (e.g., a storage device that is not performing and/or or not likely to perform a background task). That is, the I/O request 10 may include a command to write data, which would normally be performed via a normal path 31 to the first storage device 300a. However, the I/O scheduler 220 may reroute the writing of data to the second storage device 300b via the rerouted write operation 28. The rerouted write operation 28 may allow the data to be written without waiting for the first storage device 300a to finish the background task. In some embodiments, the rerouted write operation 28 may be triggered based on a likelihood of a storage device 300 performing a background task within a certain period of time exceeding a high percentage chance (e.g., an 80% chance). In some embodiments, data writes may be rerouted back to the originally intended storage device 300 after completion of the background task. In some embodiments, completion of the background task may be determined based on information received via a firmware interface of the storage device 300 that has finished the background task. In some embodiments, completion of the background task may be estimated based on an approximate time (e.g., a maximum time) for completing similar background tasks. In some embodiments, completion of the background task may be determined according to a fixed time period to prevent delays that may result from false-positive predictions. In some embodiments, rerouted data that has been written to another storage device 300 may be moved to the originally intended storage device 300 after the background task has been completed. For example, the rerouted data written to the second storage device 300b may be moved to the first storage device 300a during an idle period (e.g., during a maintenance window).

In some embodiments, the host 100 may include a neural network circuit 210 that is configured to generate background task information 20. The neural network circuit 210 may include a ML model that is trained to predict when a background task may be performed by any storage device. For example, the ML model may be trained to perform sequence forecasting. In some embodiments, the neural network circuit 210 may include a recurrent neural network, such as a long short-term memory (LSTM) algorithm. In some embodiments, the neural network circuit 210 may include a graphic neural network (GNN) or a convolutional neural network (CNN). The background task information 20 may be sent to the I/O scheduler 220 to allow the I/O scheduler 220 to determine when one or more of the storage devices 300 are likely to perform a background task. As discussed in more detail below, with respect to FIGS. 2 and 3, the neural network circuit 210 may be trained to estimate or predict when any of the storage devices 300 are likely to perform a background task based on observing a workload (or workloads) associated with each of the storage devices 300. For example, the neural network circuit 210 may be configured to receive data corresponding to workload characteristics associated with the workloads WL of one or more applications 111 running on the host 100. For example, I/O characteristics may be extracted from an I/O trace (e.g., a block I/O trace) corresponding to the I/O request 10, and workload characteristics may be extracted from the I/O characteristics. In some embodiments, wherein the storage devices 300 include solid-state drives (SSDs), a block I/O trace may be extracted directly from the I/O request 10 because SSDs are block devices. The neural network circuit 210 may estimate (or predict) when any of the storage devices 300 are likely to perform a background task based on the workload characteristics.

As discussed above, based on determining that one or more of the storage devices 300 are likely to perform a background task, the I/O scheduler 220 may reroute write requests and/or buffer read-hot data associated with the storage devices 300 that are likely to perform a background task. The I/O scheduler 220 may determine when the background task is finished and reset the routes and/or flush the read buffer 224. Accordingly, to reduce latencies, aspects of embodiments of the present disclosure allow for processing of I/O requests at storage devices to be modified based on the I/O scheduler 220 determining that one or more of the storage devices 300 are likely to perform a background task.

FIG. 2A is a system diagram depicting a system for training a neural network (NN) circuit to predict a background task in a storage device, and FIG. 2B is a listing of example data associated with workload characteristic information for training the neural network circuit, according to some embodiments of the present disclosure.

Referring to FIGS. 2A and 2B, a training system 2 may include a simulator 400 (e.g., a storage system simulation circuit) and a ML model trainer 460. The simulator 400 may include a simulator host 100S communicably coupled to one or more simulator storage devices 300S. The simulator host 100S may include a simulator application 111S and a simulator I/O scheduler 220S. In some embodiments, the simulator applications 111S may run on emulated virtual machines (VMs). The ML model trainer 460 may include the neural network circuit 210. To train the neural network circuit 210, the ML model trainer 460 may receive data associated with an I/O trace 450. The I/O trace 450 may include time stamp information 450a, workload characteristic information 450b, and storage device internal characteristic information 450c.

In some embodiments, the workload characteristic information 450b may be extracted from the I/O trace 450 corresponding to a simulator application 111S running on the simulator 400. The workload characteristic information 450b may describe the I/O trace 450 in detail. An I/O request may be issued from the simulator application 111S to the simulator storage devices 300S (individually depicted as a first simulator storage device 300Sa, a second simulator storage device 300Sb, and an n-th simulator storage device 300Sn). The simulator storage devices 300S may provide the storage device internal characteristic information 450c. For example, the simulator 400 may be configured to trace internal activity in the simulator storage devices 300S and indicate when a background task (e.g., a simulated background task) is performed by any of the simulator storage devices 300S. As used herein, "to trace" refers to observing processing activity and generating information (e.g., generating an I/O trace) to convey details about the processing activity. The storage device internal characteristic information 450c may include data indicating when the background task was performed. In some embodiments, the storage device internal characteristic information 450c may be extracted from housekeeping logs associated with the simulator storage devices 300S.

The workload characteristic information 450b and the storage device internal characteristic information 450c may be correlated (e.g., merged) by way of the time stamp information 450a. The workload characteristic information 450b extracted from the I/O trace may be selected based on a relevance (e.g., a significance) with respect to impacting or determining when a background task may be performed in a storage device. For example, in some embodiments, the workload characteristic information 450b may include data (e.g., per-storage-device data) corresponding to write throughput 500a, write-read ratio 500b, overwrite count 500c, storage device capacity utilization 500d, channels in use 500e (e.g., channels within a storage device), and/or change in throughput 500f. Write throughput 500a, which refers to an amount of data written to a device in a given amount of time, may be relevant for determining a fill rate associated with a storage device. Write-read ratio 500b may be relevant because writes may indirectly impact garbage collection. Overwrite count 500c may be relevant because overwrites may cause invalidation. Storage device capacity utilization 500d may be relevant for determining a maximum garbage collection delay possible. Channels in use 500e may be relevant because more channels may cause more garbage collection. Change in throughput 500f may be relevant for indicating the start of internal activity. Accordingly, the workload characteristic information 450b and the storage device internal characteristic information 450c may be input into the ML model trainer 460 to train the neural network circuit 210 to estimate (or predict) the possibility of a background task getting triggered in the near future in any storage device.

FIG. 3A is a diagram depicting the processing of an I/O trace to use as an input to the neural network circuit to predict the background task, according to some embodiments of the present disclosure.

FIG. 3B is a diagram depicting the processing of an I/O trace to use as an input to the neural network circuit to predict the background task, according to some embodiments of the present disclosure.

Referring to FIGS. 3A and 3B, workload characteristics may be extracted from the I/O trace 450 collected from the system that issues I/O requests. For example, in the storage system 1 (see FIG. 1), the host 100 may extract workload characteristics from the application 111 that issues the I/O request 10 to the storage devices 300 to generate extracted workload characteristics 500 (see FIGS. 3A and 3B). In the training system 2 (see FIGS. 2A and 2B), the simulator 400 may extract workload characteristics from the simulator application 111S that issues I/O requests to the simulator storage devices 300S to generate the extracted workload characteristics 500 (see FIGS. 3A and 3B). Workload characteristics may be extracted to understand I/O workloads in detail, including the changing dynamics of a workload and the intensity of a workload. In some embodiments, the extracted workload characteristics 500 may be selected to capture I/O characteristics that have been tested to be dependent on the internal activity (e.g., the background tasks) of a storage device. In other words, the extracted workload characteristics 500 may be selected based on their relevance (e.g., their significance) with respect to impacting or determining when a background task may be performed in a storage device.

To extract workload characteristics, the I/O trace 450, having a first time length T1, may be broken down into (e.g., divided into or sampled in) chunks having a first sample size TS1. For example, the first time length T1 may be 30 minutes, and the first sample size TS1 may be one minute. Thus, the I/O trace 450 may be dived into 30 samples, including a first sample of the first sample size S1a, a second sample of the first sample size S1b, and an n-th sample of the first sample size S1n. Based on each sample of the first sample size TS1, workload characteristics may be extracted across all 30 samples to represent the workload corresponding to the I/O trace 450. For example, out of all 30 samples, five data points may be extracted for each of the workload characteristics 500a-f, including the minimum value, the 25th percentile value, the 50th percentile value, the 75th percentile value, and the maximum value. For example, with respect to write throughput 500a, the minimum value could be 1 Megabyte per second (MB/s), the 25th percentile value could be 100 MB/s, the 50th percentile value could be 700 MB/s, the 75th percentile value could be 900 MB/s, and the maximum value could be 1000 MB/s. The extracted workload characteristics 500 corresponding to the first sample size TS1 may be provided as a first input vector V1 for training the neural network circuit 210 and predicting when a background task is likely to be performed by any storage device.

In some embodiments, to improve the accuracy of the neural network circuit 210, workload characteristics may also be extracted based on dividing the I/O trace 450 into chunks having a second sample size TS2. For example, the second sample size TS2 may be one second. Thus, the I/O trace 450 may be divided into 1,800 samples, including a first sample of the second sample size S2a through an n-th sample of the second sample size S2n, to further represent the workload corresponding to the I/O trace 450. Based on each sample of the second sample size TS2, workload characteristics may be extracted across all 1,800 samples to represent the workload corresponding to the I/O trace 450. For example, out of all 1,800 samples, five data points may be extracted for each of the workload characteristics 500a-f, including the minimum value, the $25^{th}$ percentile value, the $50^{th}$ percentile value, the $75^{th}$ percentile value, and the maximum value. The extracted workload characteristics 500 corresponding to the second sample size TS2 may be provided as a second input vector V2 for training the neural network circuit 210 and predicting when a background task is likely to be performed by any storage device.

Figure 4:
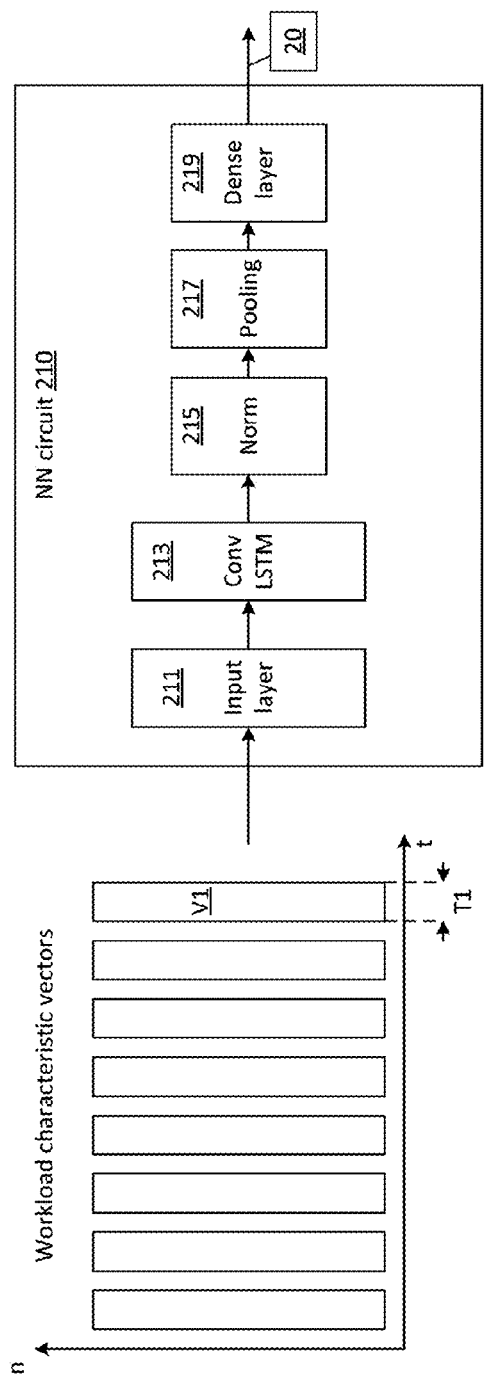
FIG. 4 is a diagram depicting internal processing aspects of the neural network circuit, according to some embodiments of the present disclosure.

FIG. 4 is a diagram depicting internal processing aspects of the neural network circuit, according to some embodiments of the present disclosure.

Referring to FIG. 4, the input to the neural network circuit 210 during training and/or during use may be the workload characteristics from a period of time in the past. For example, as discussed above, the input to the neural network circuit 210 may be the workload characteristics for the last 30 minutes as extracted from the I/O trace 450 of the last 30 minutes. The background task information 20 that is output from the neural network circuit 210 may be the probability of a background task getting triggered in the future (e.g., in the next one to five minutes).

To infer when a background task is likely to occur, based on past workload characteristics, the neural network circuit 210 may include a convolutional LSTM model, which is a type of recurrent neural network having the ability to remember relevant information and to forget irrelevant information. LSTM models may be able to remember relevant information from the past without exhibiting (e.g., being free from) the vanishing gradient problem, wherein a neural network learns slower as more layers are used. A "vanishing gradient," as used herein, refers to a problem in the field of machine learning associated with gradients that carry information used in a neural network parameter update. When a gradient approaches a value close to zero, the parameter updates become insignificant, which means that no real learning is done. The vanishing gradient problem may hamper (e.g., impede) the ability of a neural network to learn long data sequences. The ability of an LSTM model to remember and forget information as needed makes such neural networks advantageous for predicting when a background task may be triggered in a storage device. LSTM models use various sigmoid functions, known as gates, to remember and forget information as needed. An LSTM model may have the ability to apply a convolutional filter to extract relevant information from an input vector of workload characteristics.

In some embodiments, each input vector, including the first input vector V1 discussed above, may be provided as inputs to the neural network circuit 210 to process during training and during use to predict when a background task is likely to occur on any storage device. For example, the first input vector V1, as discussed above, corresponding to the I/O trace 450 and having a time length T1 equal to 30 minutes and a number of characteristics n equal to 30 may be input to an input layer 211 of the neural network circuit 210. The output of the input layer 211 may be provided as an input to a convolutional LSTM model 213. An LSTM network is a type of recurrent neural network that may learn long-term dependencies in sequence prediction problems. LSTM may be useful for predicting when a background task may occur based on workload characteristics because workload characteristics may include a long data sequence. The output of the convolutional LSTM model 213 may be provided as an input to a normalization layer 215. The output of the normalization layer 215 may be provided as an input to a pooling layer 217. The pooling layer 217 may reduce the dimensionality of input feature maps. For example, features in the first input vector V1 and other workload characteristic vectors may be associated with input feature maps, which are processed by the neural network circuit 210. The output of the pooling layer 217 may be provided as an input to a dense layer 219. The dense layer 219 may be a fully connected layer that helps to change the dimension of input vectors to a desired output vector length for further processing. The output of the dense layer 219 may correspond to the background task information 20 and may indicate a likelihood that a storage device will perform a next background task based on the extracted workload characteristics 500 (see FIGS. 3A and 3B).

Figure 5:
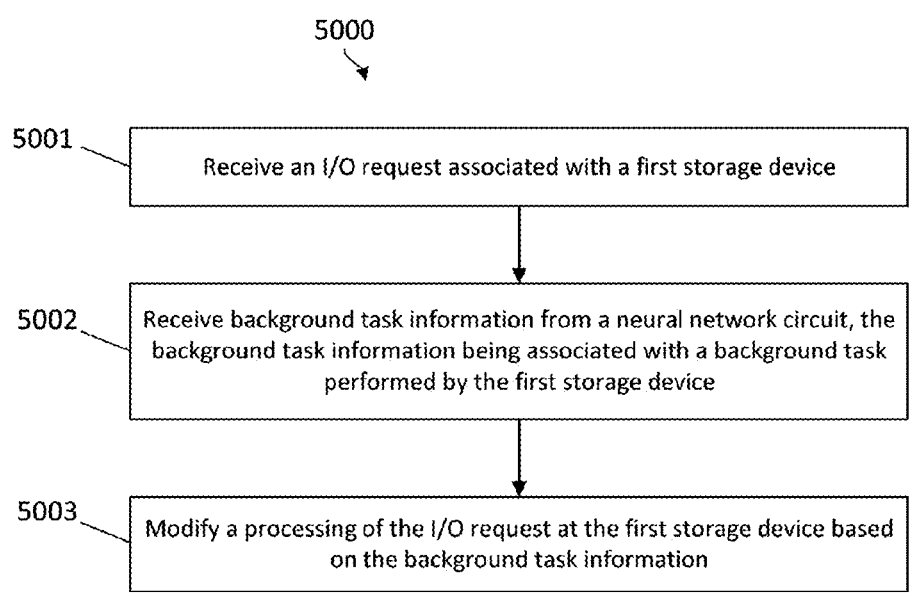
FIG. 5 is a flowchart depicting a method of processing an I/O request using machine learning to predict the background task in the storage device, according to some embodiments of the present disclosure.

FIG. 5 is a flowchart depicting a method of processing an I/O request using machine learning to predict the background task in the storage device, according to some embodiments of the present disclosure.

Referring to FIG. 5, the method 5000 may include the following example operations. An I/O scheduler 220 (see FIG. 1) may receive an I/O request 10 associated with a first storage device 300a (operation 5001). The I/O scheduler 220 may receive background task information 20 from a neural network circuit 210, wherein the background task information 20 is associated with a background task, such as a garbage cleaning operation or a wear levelling operation, performed by the first storage device 300a (operation 5002). The I/O scheduler 220 may cause a modification (e.g., may modify) a processing of the I/O request 10 at (e.g., by) the first storage device based on the background task information 20 (operation 5003).

Accordingly, aspects of some embodiments of the present disclosure may provide improvements to computer storage systems by providing for smart re-routing and I/O buffering for reduced latency and an increased throughput for an overall storage system that may be implemented without modifying existing interfaces or existing hardware of the storage system. For example, aspects of some embodiments of the present disclosure are protocol independent, such that they can be implemented, without modification, with storage devices configured for different protocols.

Example embodiments of the disclosure may extend to the following statements, without limitation:

Statement 1. An example method includes: receiving, at a scheduler, a request associated with a first storage device, receiving, at the scheduler, task information from a neural network circuit, the task information being associated with a task performed by the first storage device, and modifying a processing of the request at the first storage device based on the task information.

Statement 2. An example method includes the method of statement 1, wherein the request is an input/output (I/O) request, the scheduler is an I/O scheduler, the task is a background task, and the task information includes an indication that the first storage device has a probability of performing the background task that exceeds a threshold.

Statement 3. An example method includes the method of any of statements 1 and 2, wherein the task includes a garbage collection task or a wear levelling task.

Statement 4. An example method includes the method of any of statements 1-3, wherein the request includes a read request, and the modifying the processing of the request at the first storage device includes prefetching data from the first storage device based on the task information, storing the data at a buffer associated with the scheduler, and retrieving at least a portion of the data from the buffer based on the request and based on the task information.

Statement 5. An example method includes the method of any of statements 1-4 and further includes determining, by the scheduler, a status of the task based on information received via a firmware interface of the first storage device, and moving the data from the buffer to the first storage device based on the status.

Statement 6. An example method includes the method of any of statements 1-3, wherein the request includes a write request, and the modifying the processing of the request at the first storage device includes rerouting the processing of the request from the first storage device to a second storage device based on the task information.

Statement 7. An example method includes the method of any of statements 1-6, wherein the neural network circuit is trained to generate the task information based on a simulation circuit configured to trace operations from applications running on a host and to generate a trace based on the operations, and a machine learning (ML) model trainer configured to input data associated with the trace to the neural network circuit.

Statement 8. An example system for performing the method of any of statements 1-7 includes a processor, and a memory storing instructions, which, based on being executed by the processor, cause the processor to perform the method of any of statements 1-7.

Statement 9. An example system for performing the method of any of statements 1-7 includes a storage system, including a neural network circuit, and a scheduler configured to be communicably coupled to the neural network circuit and a first storage device.

While embodiments of the present disclosure have been particularly shown and described with reference to the embodiments described herein, it will be understood by those of ordinary skill in the art that various changes in form and details may be made therein without departing from the spirit and scope of the present disclosure as set forth in the following claims and their equivalents.

What is claimed is:

1. A method of scheduling requests in a storage system, the method comprising:
receiving, at a scheduler, a request associated with a first storage device;
receiving, at the scheduler, task information from a neural network circuit, the task information indicating a likelihood of the first storage device performing a task; and
modifying a processing of the request at the first storage device based on the task information, such that an operation associated with the request is performed at a physical location that is external to the first storage device.

2. The method of claim 1, wherein:
the request is an input/output (I/O) request;
the scheduler is an I/O scheduler;
the task is a background task; and
the task information comprises an indication that the first storage device has a probability of performing the background task that exceeds a threshold.

3. The method of claim 1, wherein the task comprises a garbage collection task or a wear levelling task.

4. The method of claim 1, wherein:
the request comprises a read request; and the modifying the processing of the request at the first storage device comprises:
  prefetching data from the first storage device based on the task information;
  storing the data at a buffer associated with the scheduler; and
  retrieving at least a portion of the data from the buffer based on the request and based on the task information.

5. The method of claim 4, further comprising:
determining, by the scheduler, a status of the task based on information received via a firmware interface of the first storage device; and
moving the data from the buffer to the first storage device based on the status.

6. The method of claim 1, wherein:
the request comprises a write request; and
the modifying the processing of the request at the first storage device comprises rerouting the processing of the request from the first storage device to a second storage device based on the task information.

7. The method of claim 1, wherein the neural network circuit is trained to generate the task information based on:
a simulation circuit configured to trace operations from applications running on a host and to generate a trace based on the operations; and
a machine learning (ML) model trainer configured to input data associated with the trace to the neural network circuit.

8. A system for scheduling requests, the system comprising:
a processor; and
a memory storing instructions, which, based on being executed by the processor, cause the processor to perform:
  receiving a request associated with a first storage device;
  receiving task information from a neural network circuit, the task information indicating a likelihood of the first storage device performing a task; and
  modifying a processing of the request at the first storage device based on the task information, such that an operation associated with the request is performed at a physical location that is external to the first storage device.

9. The system of claim 8, wherein:
the request is an input/output (I/O)) request;
the task is a background task; and
the task information is generated based on a workload associated with the first storage device.

10. The system of claim 8, wherein the task comprises a garbage collection task or a wear levelling task.

11. The system of claim 8, wherein:
the request comprises a read request; and
the modifying the processing of the request at the first storage device comprises:
  prefetching data from the first storage device based on the task information;
  storing the data at a buffer; and
  retrieving at least a portion of the data from the buffer based on the request and based on the task information.

12. The system of claim 11, wherein the instructions, based on being executed by the processor, further cause the processor to perform:
determining a status of the task based on information received via a firmware interface of the first storage device; and
moving the data from the buffer to the first storage device based on the status.

13. The system of claim 8, wherein:
the request comprises a write request; and
the modifying the processing of the request at the first storage device comprises rerouting the processing of the request from the first storage device to a second storage device based on the task information.

14. The system of claim 8, wherein the neural network circuit is trained to generate the task information based on:
a simulation circuit configured to trace operations from applications running on a host and generate a trace based on the operations; and
a machine learning (ML) model trainer configured to input data associated with the trace to the neural network circuit.

15. A storage system comprising:
a neural network circuit; and
a scheduler configured to be communicably coupled to the neural network circuit and a first storage device, the scheduler being further configured to:
  receive a request associated with the first storage device;
  receive task information from the neural network circuit, the task information indicating a likelihood of the first storage device performing a task; and
  modify a processing of the request at the first storage device based on the task information, such that an operation associated with the request is performed at a physical location that is external to the first storage device.

16. The storage system of claim 15, wherein:
the request is an I/O request;
the scheduler is an I/O scheduler;
the task is a background task; and
the storage system comprises an all-flash array.

17. The storage system of claim 15, wherein the task comprises a garbage collection task or a wear levelling task.

18. The storage system of claim 15, wherein:
the request comprises a read request; and
the modifying the processing of the request at the first storage device comprises:
  prefetching data from the first storage device based on the task information;
  storing the data at a buffer associated with the scheduler; and
  retrieving at least a portion of the data from the buffer based on the request and based on the task information.

19. The storage system of claim 18, wherein the scheduler is configured to:
determine a status of the task based on information received via a firmware interface of the first storage device; and
move the data from the buffer to the first storage device based on the status.

20. The storage system of claim 15, wherein:
the request comprises a write request; and
the modifying the processing of the request at the first storage device comprises rerouting the processing of the request from the first storage device to a second storage device based on the task information.

* * * * *